US010048653B2

(12) United States Patent
Ostrovsky et al.

(10) Patent No.: US 10,048,653 B2
(45) Date of Patent: Aug. 14, 2018

(54) WALL MOUNTED PROGRAMMABLE TIMER SYSTEM

(71) Applicant: Leviton Manufacturing Company, Inc., Melville, NY (US)

(72) Inventors: Michael Ostrovsky, Brooklyn, NY (US); Alfred Lombardi, Syosset, NY (US); Selin Tansi Glickman, Woodbury, NY (US); Cheryl Samartano, North Baldwin, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 15/269,141

(22) Filed: Sep. 19, 2016

(65) Prior Publication Data

US 2017/0003657 A1 Jan. 5, 2017

Related U.S. Application Data

(63) Continuation of application No. 13/252,157, filed on Oct. 3, 2011, now abandoned, which is a continuation (Continued)

(51) Int. Cl.

| | |
|---|---|
| ***G04F 1/00*** | (2006.01) |
| ***G04R 20/00*** | (2013.01) |
| ***G04G 5/00*** | (2013.01) |
| ***G04C 23/08*** | (2006.01) |
| ***G04C 23/44*** | (2006.01) |
| ***G04C 23/46*** | (2006.01) |

(Continued)

(52) U.S. Cl.

CPC ............ *G04F 1/005* (2013.01); *G04C 23/08* (2013.01); *G04C 23/42* (2013.01); *G04C 23/44* (2013.01); *G04C 23/46* (2013.01); *G04G 5/002* (2013.01); *G04R 20/00* (2013.01); *H01H 43/04* (2013.01); *Y10T 29/49002* (2015.01); *Y10T 307/951* (2015.04)

(58) Field of Classification Search

CPC ......... G04F 1/005; G04C 23/08; G04C 23/10; G04C 23/12; G04C 23/42; G04C 23/44; G04C 23/46; G04R 20/00; H01H 43/04; Y10T 29/49002; Y10T 307/951

See application file for complete search history.

(56) References Cited

U.S. PATENT DOCUMENTS

| | | | |
|---|---|---|---|
| 3,473,107 | A | 10/1969 | Smalley |
| 3,555,367 | A | 1/1971 | Watson |

(Continued)

FOREIGN PATENT DOCUMENTS

| | | | |
|---|---|---|---|
| EP | 0141655 | | 5/1985 |
| EP | 0156864 | A1 | 10/1985 |

(Continued)

*Primary Examiner* — Vit W Miska

(74) *Attorney, Agent, or Firm* — Carter, DeLuca, Farrell & Schmidt, LLP

(57) ABSTRACT

A timing device is disclosed which is for controlling electronic devices and which is mounted in a wall switch box. This timing device comprises at least one controller, at least one transceiver in communication with the controller, at least one interface; and at least one cover plate. This device can also include at least one key coupled to the cover plates for interacting with the interface when said cover plate is inserted onto said at least one interface.

28 Claims, 9 Drawing Sheets

Related U.S. Application Data of application No. 12/037,922, filed on Feb. 26, 2008, now Pat. No. 8,050,145.

(51) Int. Cl.

*H01H 43/04* (2006.01)
*G04C 23/42* (2006.01)

(56) References Cited

U.S. PATENT DOCUMENTS

| | | | | |
|---|---|---|---|---|
| 3,598,937 | A | 8/1971 | Balchunas | |
| 3,711,761 | A | 1/1973 | Watson | |
| 3,740,680 | A | 6/1973 | Schneidinger | |
| 3,889,132 | A | 6/1975 | Vreeland | |
| 3,939,361 | A | 2/1976 | Aidala et al. | |
| 3,979,601 | A | 9/1976 | Franklin | |
| 3,988,553 | A | 10/1976 | Astle | |
| 4,002,925 | A | 1/1977 | Monahan | |
| 4,112,313 | A | 9/1978 | Kutin | |
| 4,194,182 | A | 3/1980 | Martin | |
| 4,336,464 | A | 6/1982 | Weber | |
| 4,338,562 | A | 7/1982 | Terwilliger | |
| 4,349,748 | A | 9/1982 | Goldstein et al. | |
| 4,360,739 | A | 11/1982 | Goldstein | |
| 4,400,699 | A | 8/1983 | Glasmacher | |
| 4,422,018 | A | 12/1983 | Bailey | |
| 4,431,893 | A | 2/1984 | Levie | |
| 4,439,688 | A | 3/1984 | Schornack | |
| D273,488 | S | 4/1984 | Rosenbaum et al. | |
| D273,581 | S | 4/1984 | Rosenbaum et al. | |
| 4,440,503 | A | 4/1984 | Arichi et al. | |
| 4,494,012 | A | 1/1985 | Coker | |
| RE31,848 | E | 3/1985 | Nilssen | |
| 4,533,972 | A | 8/1985 | Ohashi | |
| D285,419 | S | 9/1986 | Schwartz | |
| 4,668,878 | A | 5/1987 | Wyss | |
| 4,777,384 | A | 10/1988 | Altenhof et al. | |
| 4,835,413 | A | 5/1989 | Nilssen | |
| 4,924,109 | A * | 5/1990 | Weber | H05B 39/085 307/126 |
| 4,950,913 | A | 8/1990 | Kephart | |
| 5,063,355 | A | 11/1991 | Sasaki et al. | |
| 5,237,264 | A * | 8/1993 | Moseley | G08C 17/00 315/291 |
| 5,264,761 | A | 11/1993 | Johnson | |
| 5,349,344 | A | 9/1994 | Head | |
| 5,397,930 | A | 3/1995 | Nilssen | |
| 5,448,630 | A | 9/1995 | Barstow | |
| 5,481,452 | A | 1/1996 | Simmons | |
| 5,508,878 | A | 4/1996 | Pecore | |
| 5,650,716 | A | 7/1997 | Kim | |
| 5,753,983 | A | 5/1998 | Dickie et al. | |
| 5,909,087 | A | 6/1999 | Bryde et al. | |
| 5,955,796 | A | 9/1999 | Nilssen | |
| 6,060,980 | A * | 5/2000 | Bedol | G04G 17/00 340/309.7 |
| 6,121,889 | A | 9/2000 | Janda et al. | |
| 6,169,377 | B1 | 1/2001 | Bryde et al. | |
| 6,259,044 | B1 * | 7/2001 | Paratore | G06F 3/04886 200/310 |
| 6,300,727 | B1 | 10/2001 | Bryde et al. | |
| 6,388,952 | B2 | 5/2002 | Kim | |
| 6,661,407 | B2 * | 12/2003 | Severson | G06F 1/1626 345/173 |
| 6,704,005 | B2 * | 3/2004 | Kato | G06F 3/0202 178/18.03 |
| 6,927,547 | B2 * | 8/2005 | Walko, Jr. | H05B 37/0272 315/312 |
| 6,933,686 | B1 | 8/2005 | Bishel | |
| 7,394,367 | B1 | 7/2008 | Aupperle et al. | |
| 7,563,131 | B2 | 7/2009 | Sullivan et al. | |
| 7,683,504 | B2 | 3/2010 | Blair et al. | |
| 8,161,877 | B1 * | 4/2012 | Frickey | F42D 1/043 102/202.5 |
| 2003/0098888 | A1 | 5/2003 | Guenther et al. | |
| 2004/0178683 | A1 | 9/2004 | Hermetz et al. | |
| 2004/0206609 | A1 * | 10/2004 | Tilley | G04G 15/00 200/10 |
| 2005/0126897 | A1 | 6/2005 | Stephens | |
| 2006/0284734 | A1 * | 12/2006 | Newman, Jr. | H01Q 7/005 340/2.24 |
| 2007/0007826 | A1 * | 1/2007 | Mosebrook | H05B 37/0209 307/139 |
| 2007/0275595 | A1 | 11/2007 | Hazani et al. | |
| 2008/0061633 | A1 | 3/2008 | Blair et al. | |

FOREIGN PATENT DOCUMENTS

| | | | |
|---|---|---|---|
| EP | 0167848 | A1 | 1/1986 |
| EP | 0259639 | A1 | 3/1988 |
| EP | 0316913 | A2 | 5/1989 |
| EP | 0376409 | A2 | 7/1990 |
| EP | 0394654 | A2 | 10/1990 |
| EP | 0730209 | A1 | 9/1996 |
| EP | 0745914 | A1 | 12/1996 |
| WO | 81/02808 | A1 | 10/1981 |

* cited by examiner

WALL MOUNTED PROGRAMMABLE TIMER SYSTEM

CROSS REFERENCE TO RELATED APPLICATIONS

This application is a continuation of U.S. application Ser. No. 13/252,157 filed Oct. 3, 2011 which is a continuation of U.S. application Ser. No. 12/037,922 filed Feb. 26, 2008, now U.S. Pat. No. 8,050,145, the disclosure of both applications is incorporated herein by reference in its entirety.

BACKGROUND

At least one embodiment of the invention relates to a programmable wall mounted timer for controlling electronic components. This wall mounted timer can be programmed with a plurality of different settings.

Other wall mounted timers are known in the art. For example, U.S. Pat. No. 6,121,889 to Janda discloses an in-wall electronic timer having a user interface. In addition, U.S. Pat. No. 5,638,947 to Finne which issued on Jun. 17, 1997 discloses a modular timer having multiple finished extension members.

However, there continues to be a need for a wall mounted timer which is easy to install in a standard wall mounted electrical box, which can be used in a single and multiple ganged electrical boxes which blend with other dimmers and switches. In at least one instance, these timers can be controlled from multiple locations wherein settings can be adjusted based on a user's need from minutes to hours.

SUMMARY

At least one embodiment of the invention relates to a wall mounted timer for use in controlling at least one component. The wall mounted timer can be easily programmed so that it is adaptable in a plurality of different situations. The timer can be programmed in any number of ways. For example, the wall mounted timer can have a face plate that has at least one interface which forms a key having a setting to indicate how many timer settings are to be indicated on a face of the device. When the face plate is coupled to the body or the housing of the device, this preconfigures the device so that at least one embodiment is now set with a particular number of lights or indications, and can be optionally set with a particular timer settings for these lights or indications.

Alternatively, the wall mounted timer can be programmed via a second interface comprising any number of rocker buttons, dimmer switches or push buttons, coupled to actuators, such that when a user presses on these buttons or switches in a particular manner, the user can program the timer condition including the number of timer settings, and a particular time for each timer setting.

Another manner for adjusting or programming the timer is through wireless communication. The timer can also communicate wirelessly with a remote control, wherein this remote control can have any number of buttons or switches coupled to actuators which when pressed in a particular manner, result in communications being sent to the timer to program the timer condition, including the number of timer settings and to set a particular time for each timer setting.

The three different ways for adjusting the timer settings or timer condition can be used together in a hybrid manner so that at least one embodiment includes an adjustable tinier that can be adjusted by all three of the above methods, including adjusting the timer setting via a key and interface, adjusting the timer setting via the interface on the housing, and adjusting the timer settings via wireless transmission.

Along with this universal programmability, the timer is also adjustable in appearance. Depending on the number of timer times set, and the time periods for each timer time, different face plates or labels can be coupled to the timer to reflect the timer condition programmed into the timer.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
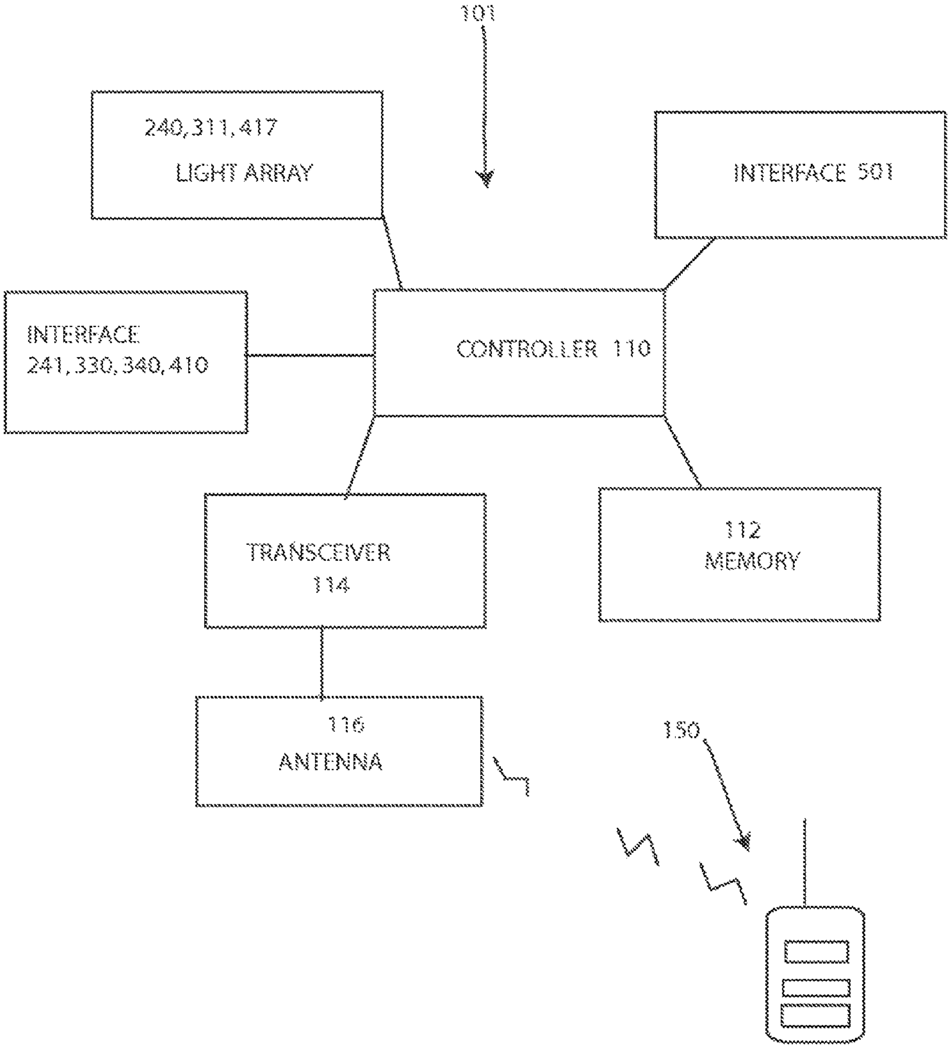
FIG. 1 is a schematic block diagram of electrical components associated with the embodiments shown in FIGS. 2-5.

FIG. 1 shows a schematic block diagram of the electronic components 101 of the timer device shown in FIGS. 2-5. For example, this design can be incorporated into any one of the housings in any one of the embodiments 200, 300, 400 and 500. This design includes a series of electronic components 101 which are used to control the setting of this timer system. The components can be in any form of components but in this example, include a controller 110 such as a microprocessor. A memory 112 is in communication with controller 110 which stores settings and a controlling program to instruct controller 110. Memory 112 is shown as one unit, and can be in the form of a flash memory such as an EEPROM or in the form of multiple memory units. In addition, a transceiver 114 is in communication with controller 110 as well as an antenna 116 which is in communication with transceiver 114. There is also a light array in communication with controller 110 which can be in the form of light array 240, light array 311, or light array 417 427 shown in FIGS. 2, 3 and 4. Controller 110 is also in communication with optional interface 501 (See FIG. 5) wherein controller 110 receives information from interface 501, and stores this information in memory 112.

In addition, there is also an interface which corresponds to any one of interfaces or series of buttons 241, 330, 340, and 410 which may be coupled to associated actuators disposed inside the housing in a known manner and used to control the timer settings and program the timer settings. These interfaces, in the form of associated buttons paddles or switches, can be pressed in particular sequences to relay new timer settings to controller 110. The program stored in memory 112, has values associated with the pressing of buttons on the controller so that these instructions sent to controller 110 are then stored in memory 112 and operated on by controller 110 to either change a desired time of an associated timer setting, switch to a particular timer countdown, or remove timer settings as well.

Another way to program or interface with controller 110 is through wireless transmission of information to controller 110. For example, a remote control 150 can be used to set the timer condition of the timer including the number of timer settings and the time periods for each setting. As disclosed above, the timer settings can be controlled wirelessly by relaying information from remote control 150 to controller 110 through antenna 116 and transceiver 114 and then setting the appropriate number of timer settings, setting the desired timer increments, or setting a particular time for counting down, and then storing these characteristics in memory 112. The antenna system 116 can be formed in any suitable manner such as a manner similar to that shown in U.S. patent application Ser. No. 11/559,646, filed on Nov. 14, 2006, the disclosure of which is hereby incorporated herein by reference.

Figure 2:
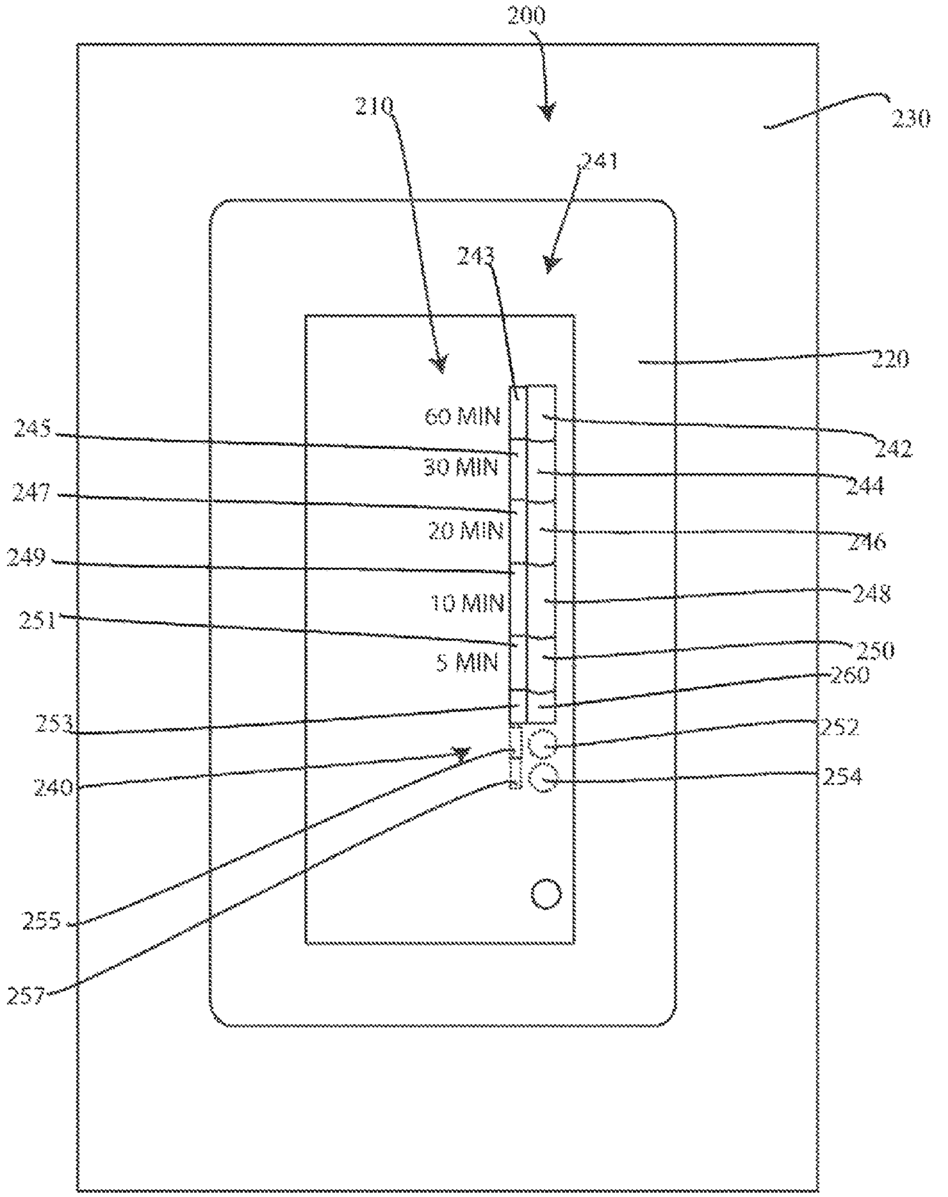
FIG. 2 is a first embodiment of the timer.

FIG. 2 is a front view of a first embodiment of the timer 200. With this view, there are multiple lights shown, each with a different setting. There are indicia disposed on a front face, which can be either pre-printed thereon, placed thereon with a label, or omitted depending on the user's desire. This indicia indicates the amount of time left in each timer setting. Shown in FIG. 2 are the time intervals 5, 10, 20, 30, and 60 minutes. These time intervals are shown for illustrative purposes only and the intervals may be set to any suitable lengths of time as desired by the user. Timer 200, as shown, includes an inner cover plate 210, an intermediate outer lace plate 220 and an additional outer face plate 230. A series of buttons 241 including buttons 242, 244, 246, 248, and 250 and 260 are disposed on the front face adjacent to the light array 240 which for example, includes associated indicating lights 243, 245, 247, 249, 251, and 253. In this case, these indicating lights can be in the form of LED indicating lights that are disposed behind a light pipe. The number of exposed lights on this face are controlled by the size and shape of cover plate 210 which is coupled to face plate 220. For example, in this embodiment, unused actuators 252 and 254 are shown by dashed circles and are disposed beneath cover plate 210. These unused actuators are consequently programmed to be inactive based upon the instructions sent by a user. Thus, these unused actuators are covered by plate 210. Similarly, unused lights 255 and 257 are shown by dashed lines disposed beneath and covered by plate 210.

The settings relating to the number of lights, and the number of buttons is controlled by either pressing on particular buttons 242-260, through wirelessly sending instructions from a remote control or through the insertion of a unique faceplate. An example of this process is shown by way of example in FIGS. 7 and 8.

This face shows an example of settings wherein with these settings, button 242 when pressed, selects the 60 minute time period which then activates the 60 minute LED light 243. In addition, the 30 minute button 244 can then be selectively pressed to set the 30 minute time period which then activates the 30 minute light 245 to indicate that this time has been set as well. Accordingly, the 20 minute button 246 can be pressed which then activates the 20 minute light 247 which sets this time. Other buttons such as ten minute button 248 or five minute button 250 can be pressed to set these times as well. Alternately, the unit can be programmed such that any suitable button, or buttons, can activate and suitable light, or lights.

Figure 3:
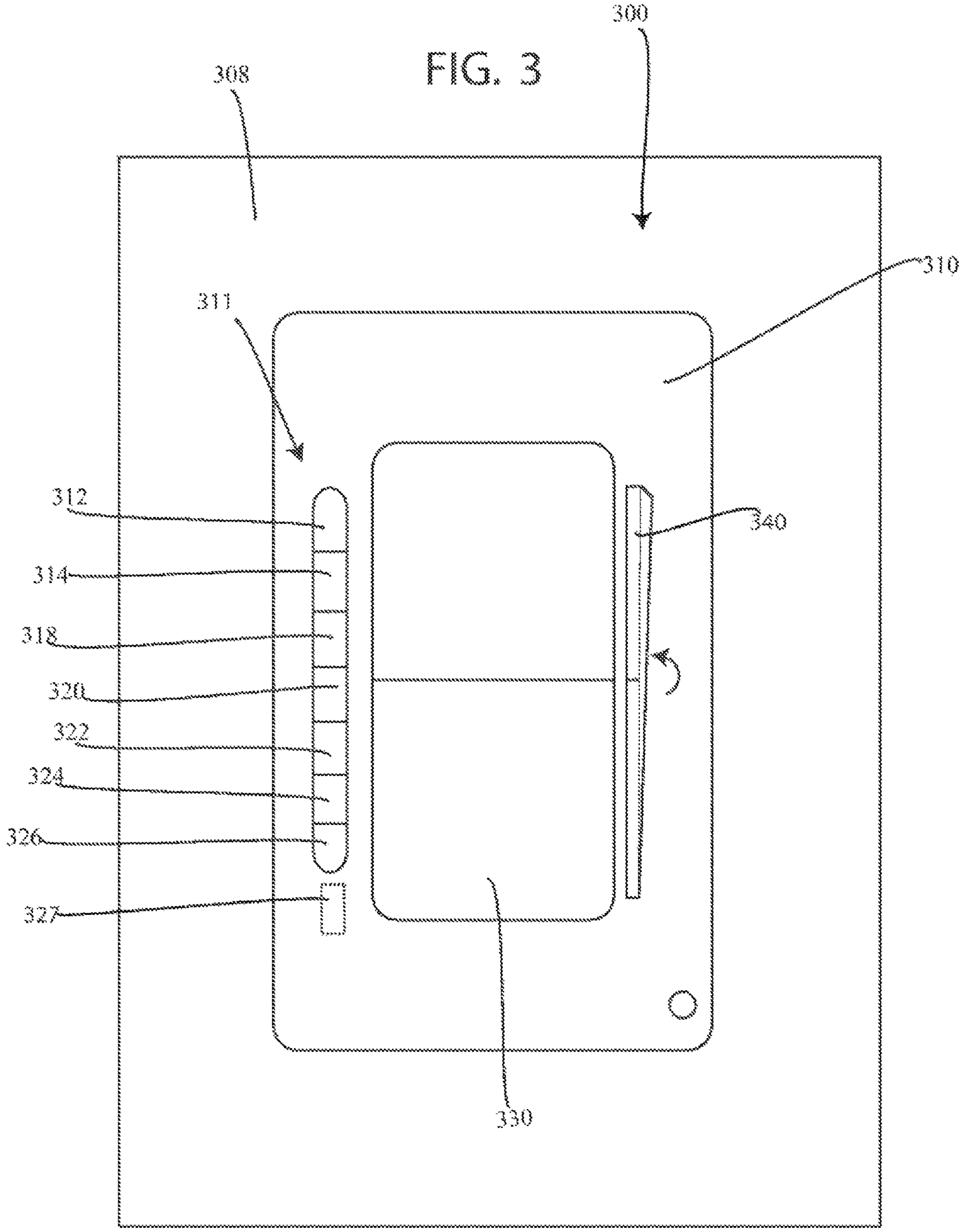
FIG. 3 is another embodiment of the timer.

FIG. 3 is a from view of another embodiment 300. With this embodiment, there is a front plate 308 which is coupled to a cover plate 310. In addition, a rocker paddle 330 is coupled to plate 310 wherein this entire assembly can be stored into a single gang electrical enclosure. There is also a series of lights in a light array 311. These lights are 312, 314, 318, 320, 322, 324, 326 and 327 (shown covered) which indicate, in this case, a particular time for counting down. In addition, there is also a dimmer button 340 which may be used to program the device. For example, as explained in step 1001, (See FIG. 10) the paddle 330 can be pressed along with dimmer button 340 to set a particular time. For example, if the user presses both the rocker paddle 330 and the dimmer button 340 then the user can preset a particular time as indicated by LED lights 312, 314, 318, 320, 322, 324, and 326. By pressing the rocker paddle 330 up along with dimmer button 340, the highest timer setting 312 can be set. Alternatively, once this time is selected a user can scroll down to lower times by pressing on the down section of rocker paddle 330 so that the lower times are set as well.

Therefore, the user can then scroll down from a highest setting as indicated by light 312 down to a next highest setting as indicated by light 314, to a next highest setting as indicated by light 318, down to the additional settings associated with lights 320, 322, 324, and 326. Alternatively, the process for programming this embodiment can be used to program dimmer intensity levels as well. Instead of using the process for program timers, a dimmer can be set wherein the dimmer setting can be set by scrolling through or setting a highest dimmer setting as designated by light 312 and then scrolled down to lower dimmer levels indicated by lights 314, 318, 322, 324, 326, and 327. Likewise, any other suitable electrical load could be controlled by this embodiment such as, but not limited to, motors, appliances, lamp shades, and so on.

Thus, by pressing rocker paddle 330 up along with dimmer button 340 this sets the highest dimmer level. Once this dimmer level is set, a user can scroll down to lower dimmer settings by pressing on the down section of the rocker paddle 330. The light then scrolls down through the various dimmer levels rather than incrementally via dimmer button 340.

Figure 4:
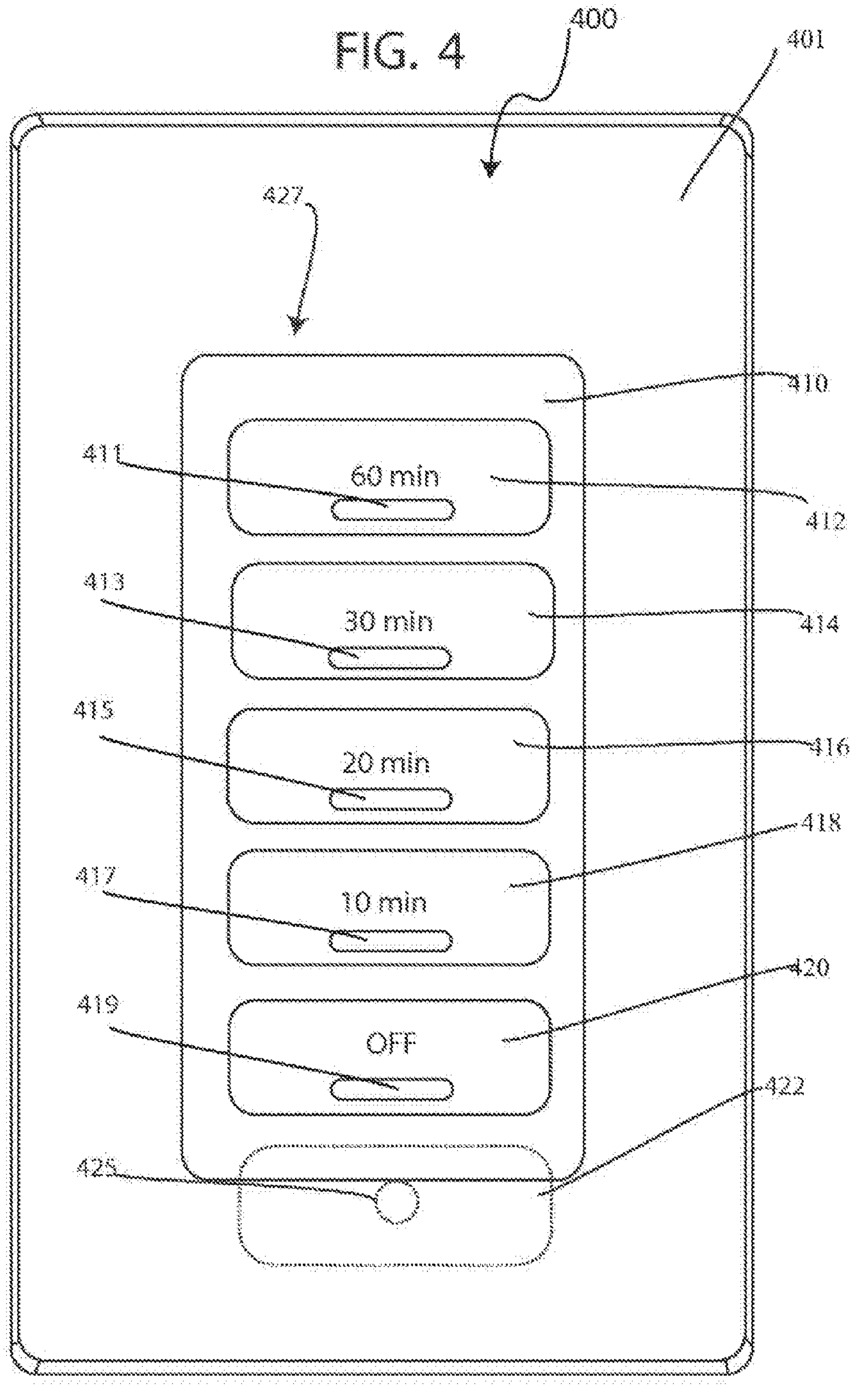
FIG. 4 is another embodiment of the timer.

FIG. 4 shows an alternative embodiment which shows a face plate 401, a cover plate 410 and a series of buttons 412, 414, 416, 418, and 420 which can beset by pressing them and holding them to set the appropriate time. Shown in FIG. 4 are the time intervals 10, 20, 30, and 60 minutes. These time intervals are shown for illustrative purposes only and the intervals may be set to any suitable lengths of time as desired by the user. Alternatively, the embodiment may be programmed with any suitable method. In addition, there is a series of lights 411, 413, 415, and 417 and 419 forming a light array. For example, if button 412 is pressed and held, an associated light 411 is illuminated indicating that this time has been set. Alternatively, if button 414 is pressed and held then the associated light 413 is lit indicating that this time is to be set instead. Next, if button 416 is pressed and held, light 415 is lit indicating that this time has been preset. Next, if button 418 is pressed and held, light 417 is lit indicating that this time has been set. Alternatively, if button 420 is pressed and held, light 419 lights up indicating that the load (such as a light) has been shut down.

One way to provide an indication of the time left is if, for example, a person sets the timer to last for sixty minutes by pressing button 412. This causes light 411 to be lit, once the time period approaches the next time indication, the light 411 for example will flash and then turn off while light 413 will then turn on indicating that the timer has only thirty minutes left. The time will then progressively scroll down until it reaches the off position. A user can selectively program whether the off button should remain on or off after all of the lights have been tamed off.

In addition, as shown in this embodiment, cover plate 410 and face plate 401 can be used to cover unused actuators 425 which are selectively covered by selecting a particular face. In this case, for each button, there is an associated actuator disposed in the housing and behind each button. If a user decides to limit the number of timer settings, that user can cover a particular actuator, which would not be coupled to a button, and then program controller 110 so that the covered actuator is registered as inactive.

Figure 5:
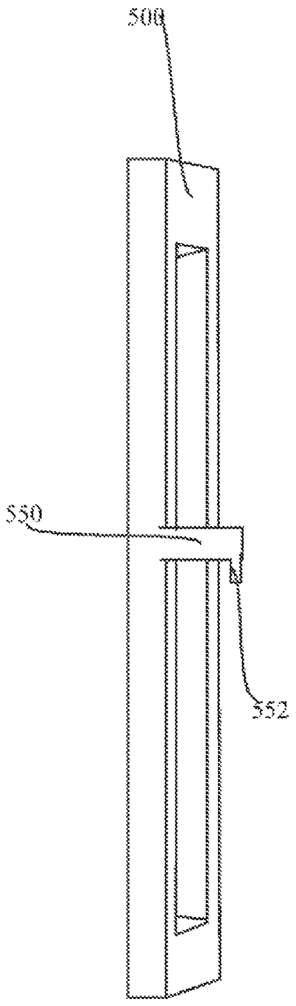
FIG. 5 is a side perspective view of a cover plate having a key.

FIG. 5 shows a side view of a plate or cover 500 having an extension member 550 and a key 552. This extension member 550 and associated key 552 are designed to interface with an associated interface 501, (See FIG. 6) having a series of different sections 510, 512, 514, 516, 518, and 520 for interaction with key 552. These different sections 510-520 may be discrete electrical contacts which are designed to send different signals or instructions to controller 110 depending on whether these contacts have been contacted by key 552. Alternatively, the interface may be optical or magnetic in nature responsive to an appropriate key. Therefore, the positioning of this key 552 on arm 550 is used to determine any one of the following: the number of desired timer settings; the number of desired lighting elements to be shown; and the times of the timer settings as well. For example, depending on the section of interface 501 that is intersected, the key 552 intersects the interface 501 in particular sections so that instructions can be sent from interface 501 to an associated processor such as controller 110 to configure the desired timer conditions.

Alternatively, this key 552 which interacts with the associated interface 501, can be used to set dimmer functions as well such that when key 552 interacts with particular sections, the information sent from interface 501 is then sent onto controller 110 as a set of instructions to pre-program a dimmer interface.

Figure 6:
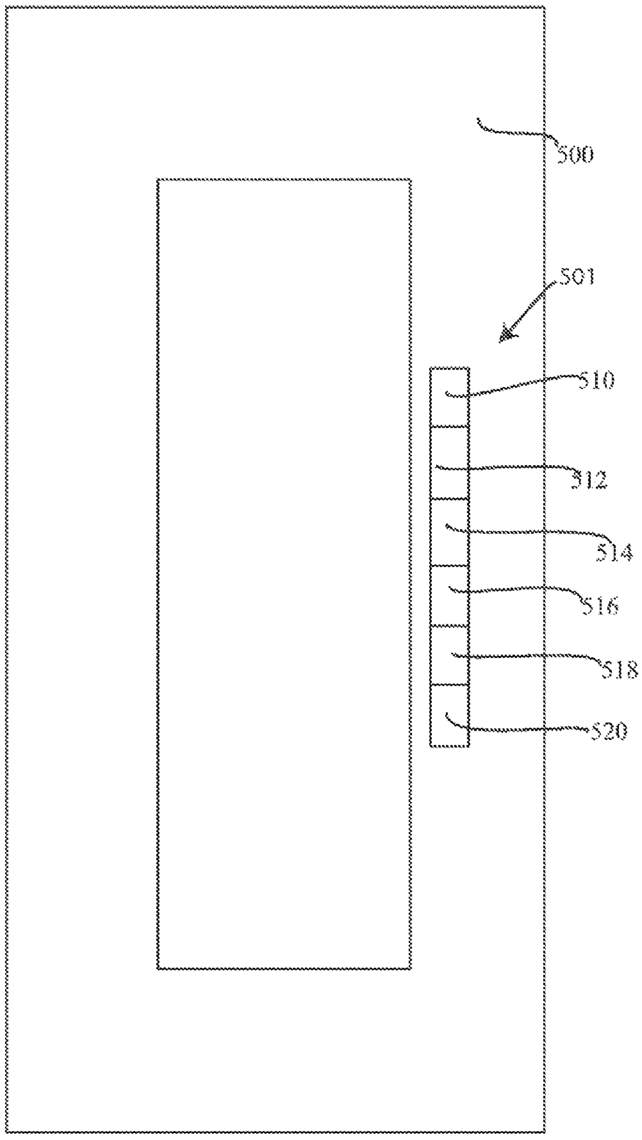
FIG. 6 is a front view of a housing having an interface for interfacing with the coverplate of FIG. 5.
Figure 7:
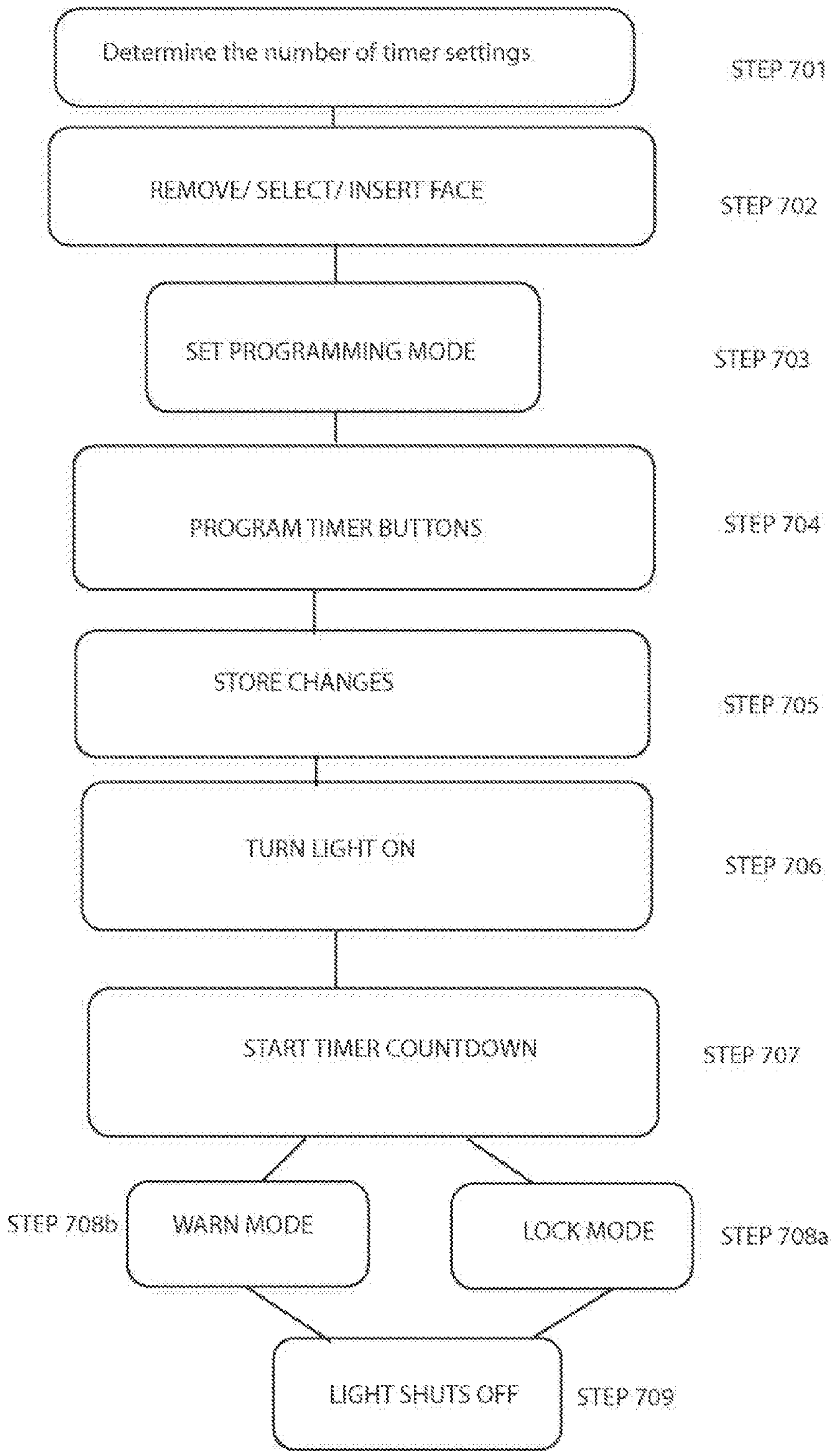
FIG. 7 is a flow chart for programming and using the timer.

FIG. 7 is a flow chart showing an example for programming any one of the elements shown above (such as timers, dimmers, speed controllers, and the like). For example, in step 701 a user would determine the desired number of timer settings. Depending on the desired number of timer settings the user would in step 702 then select or remove a cover plate or face for the timer. The selection of a face is used for both aesthetic reasons and can also be used to set the appropriate number of timer settings or steps for programming in a manner as shown in FIGS. 5 and 6. This step is shown in greater detail in FIG. 8.

Figure 8:
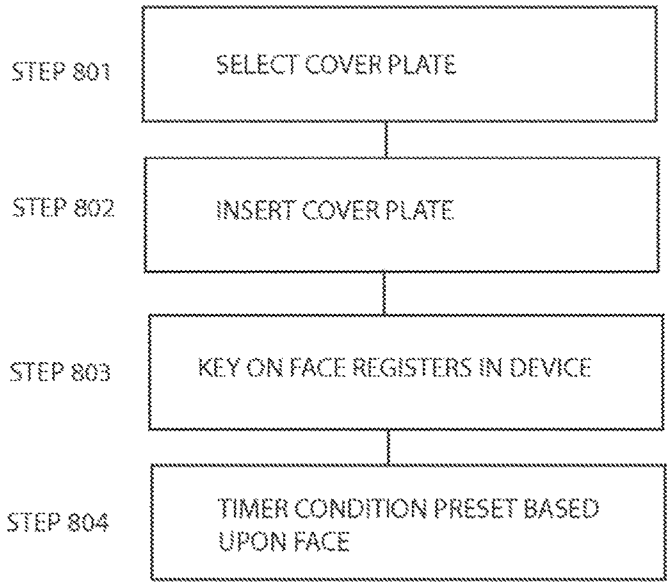
FIG. 8 is a more detailed flow chart for at least one step in FIG. 7.

FIG. 8 shows a more detailed process for step 702. For example, in step 801 a user selects a cover plate from an array of cover plates to cover the housing of the timer. Depending on the type of cover selected, the key is then used to determine the appropriate number of timer settings. Next in step 802 the user inserts the cover plate into the housing. In step 803 the key on the cover plate (such as key 552) registers with the device by interfacing with interface 501. Depending on the section contacted on the interface, a set of signals or instructions are sent to controller 110 to set the timer settings. Next, in step 804 the timer condition is now preset with a preset number of timer settings for the user to either set originally or reset depending on the instructions sent from interface 501 to controller 110. In addition, this key can also be used so that when it interacts with interface 501, it also can optionally set the times for each timer setting.

By setting this cover plate into the device the programming mode is automatically set. Next, in step 703, the programming mode is set either by pressing on particular buttons on the interface or by pressing on buttons on a remote control. The programming mode is essentially a mode where each of the timer, or dimmer, devices is now open to programming changes. Next step 704 includes programming particular timer billions, so that the incremental times are set.

Steps 701-704 essentially set the timer condition. With the present embodiment, due to the interchangeable cover plate, and the programmable buttons, the timer condition is universally adaptable. A timer condition can be either a characteristic of the number of timer settings that are arranged on a front face, and/or include the predetermined time settings for times as well. For example, depending on the front face, a timer setting can be four sets of times, wherein for example, each incremental timer set is for 20 minute intervals. Thus, there would be buttons and indicators for 80 minutes, 60 minutes, 40 minutes and 20 minutes, based upon these timer conditions. The parameters of these timer conditions can be varied depending on the number of buttons or actuators actually presented, and the preset stored times.

Alternatively, the timer settings can be five different timer settings with any associated timer interval such as 10 minutes, (resulting in a 50 minute button; a 40 minute button; a 30 minute button; a 20 minute button; and a 10 minute button), or six different timer settings with any associated tinier interval such as 10 minutes, 15 minutes, 20 minutes or even just 5 minutes as well. These preset settings can be changed after the cover plate installation as well.

Figure 9:
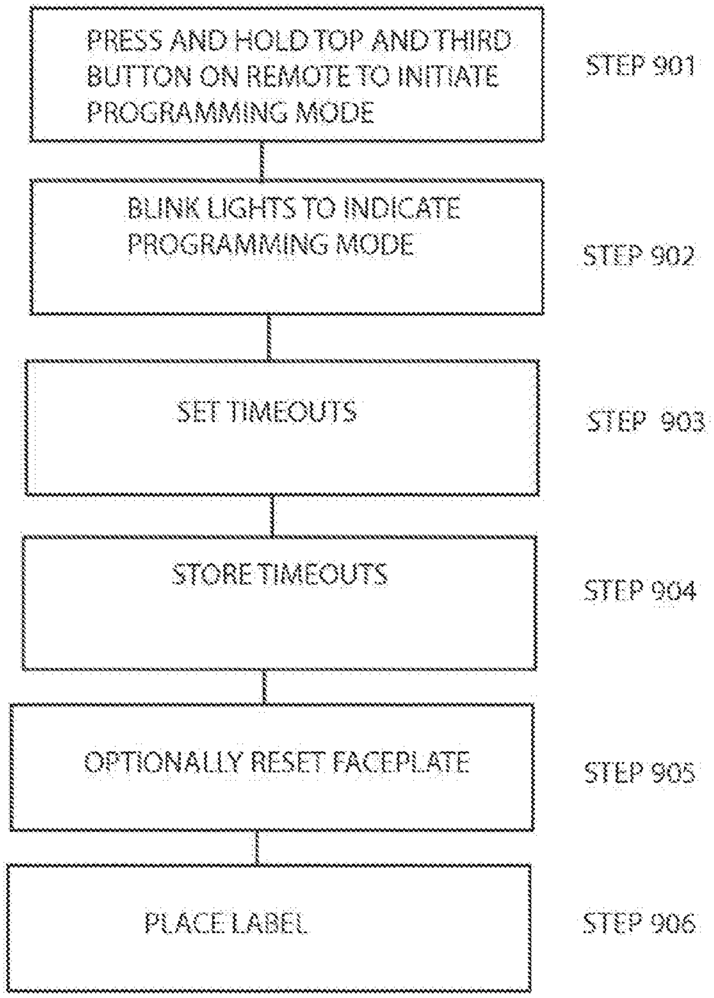
FIG. 9 is a flow chart for at least one step in FIG. 7.
Figure 10:
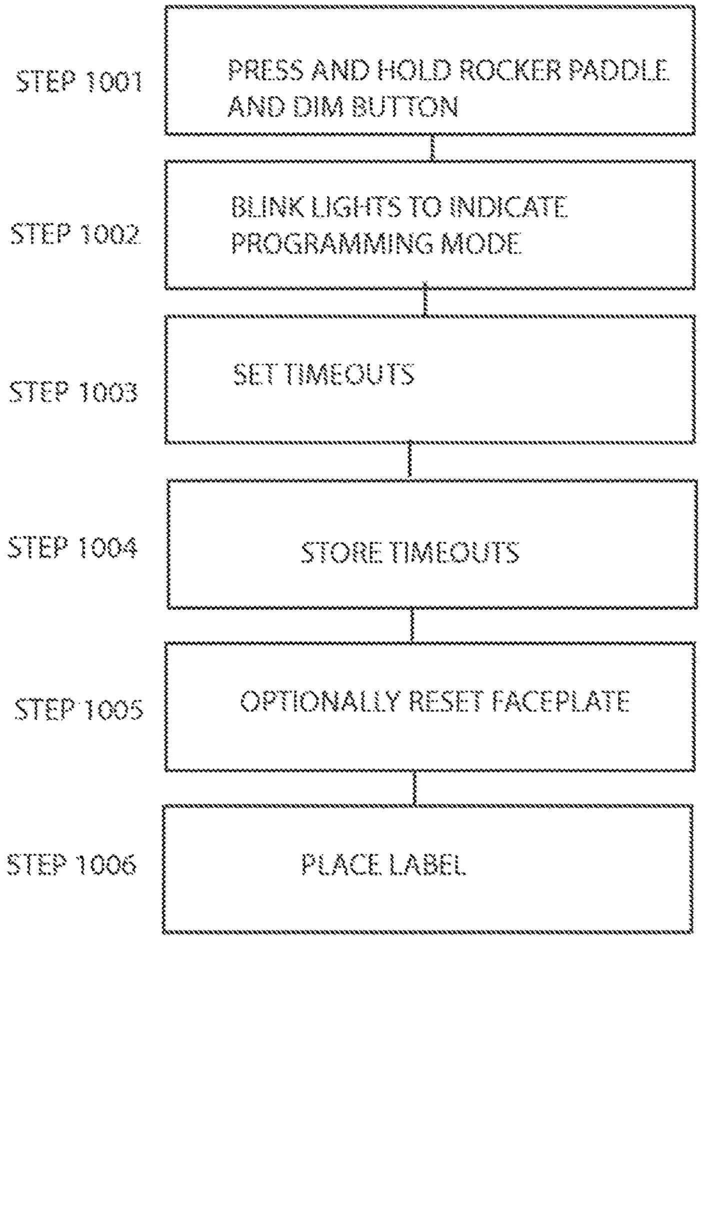
FIG. 10 is a flow chart for another embodiment shown in FIG. 7.

FIGS. 9 and 10 and are flow charts for programming the different embodiments of timers, after the face has been inserted into the housing. For example steps 901 to 906 and steps 1001 and 1006 are more elaborate representations of step 704.

FIG. 9 shows an example of a process for performing step 704, using the embodiments shown in FIGS. 2 and 4. In step 901, a user presses and holds a top, and an adjacent button such as a third button (button 246 in FIG. 2 and button 416 in FIG. 4) to initiate a programming mode. Next, in step 902, the lights blink to indicate that the device is in the programming mode. Next, in step 903, each of the timeout settings are set by pressing and holding onto each button for a period of time and then setting the time through pressing on additional buttons such as one of two adjacent buttons indicating an associated increase or decrease in time.

FIG. 10 is an example of the process for performing step 704 for the timer shown in FIG. 3. FIG. 3 shows a series of timer settings or timeouts 312-326. The setting of these timeouts occurs through step 1001 by pressing either a rocker button 330 and paddle or dimmer button 340 up or down, to start the programming mode. Accordingly, in step 1002 the lights blink indicating that the programming mode has started. Once each of the timeouts is set, in step 1003, a user can store these timeouts in step 1004. The storage of these timeouts is then stored in an associated memory, (See memory 112 in FIG. 1 as an example) which can be part of a controller or a separate unit. Next, in slop 1005 the user can optionally change or alter a faceplate by removing a faceplate or inserting a label such as in step 1006 on the faceplate to have new set of designations for the device. In this way, the description on the front of the faceplate can accurately match the designations associated with the timer.

Once all of the times for any one of the processes described above have been set, a user can finally store all of the changes in step 705 (See FIG. 7). Next, in step 706 a user can turn a light on. Next, a user can then initiate a timer countdown in step 707. During this timer countdown, the controller 110 can initiate a lock mode, as disclosed in step 708*a*, wherein a light associated with a particular timer setting would blink indicating that the timer is moving down to the next time interval. Alternatively, in step 708*b*, a user can select a warn mode by pressing and holding a button such as any one of buttons 242-260 or buttons 412 to 418 or 420. The lock mode is for locking the light on or off depending on whether a user presses and holds either a timer button to keep the light on, or an off button to turn the light off.

Alternatively, in the embodiment shown in FIG. 3, the user can press the dimmer button 340 or the rocker button 330 for a predefined period of time so that the timer switches to the lock mode. In this state, the side LEDs go to an off mode so as to indicate a lock mode.

Once this lock mode has been set, there are ways to terminate this mode. For example, a user can turn the lights OFF using a rocker paddle such as rocker paddle 330. Next, the timer turns off along with the side bar display and the last adjusted timeout settings. Next time when the light is turned on, the user may terminate the lock mode by pressing down the rocker down button. In this case, the timer then returns to the previously set timeout settings.

These same steps described in FIGS. 7-10 can be performed using a wireless remote control 150 wherein having the same or substantially similar user interfaces as those shown in FIGS. 2, 3, and 4.

In addition, the steps shown in FIGS. 7-10 can also be adapted so that these steps can be used to program a dimmer as well. For example, a user can select a particular face for a dimmer as described in step 702. Next, to set to programming mode, a user can either insert a particular cover plate, and hold particular buttons such as the lop and third buttons as described in step 901 or press and hold the rocker and dim buttons in step 1001.

For example, steps 901-906 can be adapted to address dimmers so that in step 901 a user can press and hold top and third buttons to set the programming modes. Next, in step 902 the lights associated with these buttons would blink to indicate that the device is in a programming mode. Next in step 903 the dimmer levels can be set and then in step 904 the timeouts can be stored. Next, in step 905 the faceplate can be optionally reset based upon the changes to the dimmer. Finally any labels that are desired can be set so that the necessary indications are applied next to these buttons.

In addition, steps 1001-1006 can be modified so that they can be used to program a dimmer as well. In this case, as described above, a user can press and hold the rocker paddle and dim button in step 1001 to initiate a programming mode. Next, in step 1002 the lights associated with this device would blink indicating the device is in a programming mode. Next in step 1003 the dimmer settings can be set, as described above. In this case, the dimmer settings are set on a staggered basis which can be based upon the number of buttons where each setting corresponds to a percentage of light level for the dimmer or on an entirely customized level as well wherein each button has its own individual light level. Next, in step 1004 the dimmer levels are stored, wherein in step 1005 the faceplate can then be optionally reset while in step 1006 a label can be placed on the faceplate to indicate the dimmer levels as well.

Overall, these designs create a universally adjustable timer, dimmer, speed control, or other suitable controller, for controlling electronic components such as lights, or other downstream loads. With these designs, the number of timer settings, as well as the individual timer times can be universally set. The three types of setting control can be either with the insertion of a unique faceplate into an interface on the housing, through manual programming via buttons or paddles on the timer itself, or through wireless transmission from a remote control to the device to control the number of timer settings and the time for the settings. The three different types of timer control can be used exclusively to control the time or, on at least one embodiment, any one of the three types of setting control can be used in a partial manner so that the setting of a light can occur partially through insertion of a faceplate, partially through the programming of buttons and partially wirelessly. Through adjustments in the number of timer settings, each time setting and the associated lace plate, a user could, with one single timer, create the number of settings and desired time settings that they wish.

Accordingly, while only a few embodiments of the present invention have been shown and described, it is obvious that many changes and modifications may be made thereunto without departing from the spirit and scope of the invention.

What is claimed is:

1. A method for wirelessly programming a timer, the method comprising:

determining, by a controller of a timer, a number of available settings of the timer;

receiving input, by a wireless device, regarding parameters for at least one of the available settings;

transmitting, by the wireless device, the parameters to the timer; and configuring, by the controller of the timer, at least one of the available settings based on the parameters, wherein the parameters are customizable by a user of the wireless device such that the user of the wireless device can adjust magnitudes of the available settings.

2. The method according to claim 1, wherein the number of available settings are determined based on a cover plate of the timer.

3. The method according to claim 2, wherein the cover plate is adapted to prevent usage of at least one setting of the timer, thereby causing at least one setting of the timer to be unavailable.

4. The method according to claim 2, wherein the number of available settings correspond to a number of buttons on the cover plate.

5. The method according to claim 1, wherein the number of available settings correspond to a number of actuators of the timer.

6. The method according to claim 1, wherein the number of available settings correspond to a number of lights in a light array of the timer.

7. The method according to claim 1, wherein the parameters include one or more of a time period, a timer increment, a particular time, a dimmer intensity value, and a speed control value.

8. The method according to claim 1, further comprising storing the parameters in a memory of the timer.

9. The method according to claim 1, wherein transmitting the parameters to the timer includes relaying, by the wireless device, the parameters to the controller of the timer via an antenna and a transceiver of the timer.

10. A system for wirelessly programming a timer, the system comprising:

a timer including a controller configured to:

determine a number of available settings of the timer;

receive parameters for at least one of the available settings from a wireless device; and configure at least one of the available settings based on the parameters, wherein the wireless device is configured to:

receive input from a user regarding the parameters for at least one of the available settings, and transmit the parameters to the timer, wherein the parameters are customizable by a user of the wireless device such that the user of the wireless device can adjust magnitudes of the available settings.

11. The system according to claim 10, wherein the timer further comprises a removable cover plate, and wherein the number of available settings are determined based on the removable cover plate.

12. The system according to claim 11, wherein the cover plate is adapted to prevent usage of at least one setting of the timer, thereby causing at least one setting of the timer to be unavailable.

13. The system according to claim 11, wherein the cover plate includes a number of buttons, and wherein the number of available settings correspond to the number of buttons.

14. The system according to claim 10, wherein the timer further comprises a number of actuators, and wherein the number of available settings correspond to the number of actuators.

15. The system according to claim 10, wherein the timer further comprises a light array including a number of lights, and wherein the number of available settings correspond to the number of lights in the light array.

16. The system according to claim 10, wherein the parameters include one or more of a time period, a timer increment, a particular time, a dimmer intensity value, and a speed control value.

17. The system according to claim 10, wherein the timer further comprises a memory, and wherein the controller is further configured to store the parameters in the memory.

18. The method according to claim 10, wherein the timer further comprises an antenna and a transceiver, and wherein the wireless device is further configured to transmit the parameters to the timer by relaying the parameters to the controller via the antenna and the transceiver.

19. A method for wirelessly programming an electrical load control device, the method comprising:

determining, by a controller of an electrical load control device, a number of available settings of the electrical load control device;

receiving input, by a wireless device, regarding parameters for at least one of the available settings;

transmitting, by the wireless device, the parameters to the electrical load control device; and configuring, by the controller of the electrical load control device, at least one of the available settings based on the parameters, wherein the parameters are customizable by a user of the wireless device such that the user of the wireless device can adjust values of the available settings.

20. The method according to claim 19, wherein the number of available settings correspond to a number of actuators of the electrical load control device.

21. The method according to claim 19, wherein the number of available settings correspond to a number of lights in a light array of the electrical load control device.

22. The method according to claim 19, wherein the parameters include one or more of a time period, a timer increment, a countdown time, a particular time to start a countdown, a dimmer intensity value, and a speed control value.

23. The method according to claim 19, wherein the dimmer intensity value is a high end intensity value, a low end intensity value, or a dimmer intensity increment.

24. The method according to claim 19, further comprising storing the parameters in a memory of the electrical load control device.

25. The method according to claim 19, wherein transmitting the parameters to the electrical load control device includes relaying, by the wireless device, the parameters to the controller of the electrical load control device via an antenna and a transceiver of the electrical load control device.

26. The method of claim 19 wherein the electrical load control device comprises a dimmer, a fan speed controller, a timer, a switch, a motor controller, an appliance controller, or a lamp shade controller.

27. The method of claim 19 further comprising a programming mode, wherein the programming mode is entered by receiving an input on the electrical box mounted device or the wireless device.

28. The method of claim 19 further comprising a programming mode and an indicator, wherein when the programming mode is entered, the indicator is energized.

* * * * *